United States Patent
Rabii

(10) Patent No.: US 8,977,874 B2
(45) Date of Patent: *Mar. 10, 2015

(54) SYSTEM AND METHOD FOR BATTERY LOAD MANAGEMENT IN A PORTABLE COMPUTING DEVICE

(75) Inventor: Khosro M. Rabii, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 293 days.

This patent is subject to a terminal disclaimer.

(21) Appl. No.: 13/428,127

(22) Filed: Mar. 23, 2012

(65) Prior Publication Data

US 2013/0198541 A1 Aug. 1, 2013

Related U.S. Application Data

(60) Provisional application No. 61/591,149, filed on Jan. 26, 2012.

(51) Int. Cl.
| | |
|---|---|
| *G06F 1/26* | (2006.01) |
| *G06F 11/30* | (2006.01) |
| *G06F 1/32* | (2006.01) |
| *H04W 52/02* | (2009.01) |

(52) U.S. Cl.
CPC ............. *G06F 11/3062* (2013.01); *G06F 1/26* (2013.01); *G06F 1/3234* (2013.01); *G06F 1/3212* (2013.01); *H04W 52/0261* (2013.01)
USPC ............................ 713/320; 713/321; 713/323

(58) Field of Classification Search
CPC .................................................... Y02T 10/7005
USPC ......................................... 713/320, 321, 323
See application file for complete search history.

(56) References Cited

U.S. PATENT DOCUMENTS

| | | | |
|---|---|---|---|
| 7,671,566 B2 | 3/2010 | Du | |
| 2006/0001402 A1 | 1/2006 | Kim et al. | |
| 2008/0201587 A1* | 8/2008 | Lee ............................... | 713/320 |
| 2008/0263375 A1 | 10/2008 | Sundstrom et al. | |
| 2009/0132186 A1 | 5/2009 | Esnard et al. | |
| 2010/0077236 A1* | 3/2010 | Trautman et al. ............. | 713/300 |
| 2010/0134305 A1 | 6/2010 | Lu et al. | |
| 2010/0321647 A1* | 12/2010 | Schuler et al. ................ | 353/121 |
| 2011/0111799 A1 | 5/2011 | Kothari et al. | |
| 2012/0217934 A1* | 8/2012 | Zhou et al. .................... | 320/136 |
| 2012/0272077 A1* | 10/2012 | Dow et al. ..................... | 713/310 |

OTHER PUBLICATIONS

International Search Report and Written Opinion—PCT/US2013/020615—ISA/EPO—May 23, 2013.

* cited by examiner

*Primary Examiner* — Jaweed A Abbaszadeh
*Assistant Examiner* — Alyaa T Mazyad
(74) *Attorney, Agent, or Firm* — Nicholas A. Cole

(57) ABSTRACT

Various embodiments of methods and systems for managing battery load in a portable computing device ("PCD") are disclosed. One such method includes tracking an active load on a battery attributable to one or more active power consuming components. Measurements associated with the battery and indicative of the battery's state of health may also be monitored. When a call for additional load on the battery is recognized, such as a user request for provision of additional functionality in the PCD, a future load on the battery that considers the newly called load can be calculated. Based on an analysis of the impact on the battery's state of health, existing, lower priority loads may be scaled or suspended to create battery load capacity for the newly called load. In this way, quality of service and user experience may be optimized while minimizing conditions that could be detrimental to the battery.

32 Claims, 7 Drawing Sheets

SYSTEM AND METHOD FOR BATTERY LOAD MANAGEMENT IN A PORTABLE COMPUTING DEVICE

CROSS-REFERENCE TO RELATED APPLICATIONS

Priority under 35 U.S.C. §119(e) is claimed to the U.S. provisional application entitled "SYSTEM AND METHOD FOR BATTERY LOAD MANAGEMENT IN A PORTABLE COMPUTING DEVICE," filed on Jan. 26, 2012 and assigned application Ser. No. 61/591,149, the entire contents of which are hereby incorporated by reference.

DESCRIPTION OF THE RELATED ART

Portable computing devices ("PCDs") are powerful devices that are becoming necessities for people on personal and professional levels. Although some PCDs may generate a lot of thermal energy when operating, they typically do not include active cooling components like fans. Examples of PCDs may include cellular telephones, portable digital assistants ("PDAs"), portable game consoles, palmtop computers, and other portable electronic devices.

As users have become more and more reliant on PCDs, demand has increased for more and better functionality. Simultaneously, users have also expected that the quality of service ("QoS") and overall user experience not suffer due to the addition of more and better functionality. Paradoxically, providing more and better functionality in PCDs without sacrificing QoS and user experience necessitates higher and higher milliamp hours ("mA-Hr") of battery capacity.

Generally, providing more mA-Hr of battery capacity in a PCD simply means including a larger battery. However, the trend in PCD design is for smaller form factors which often preclude the inclusion of a larger battery. Moreover, because the mA-Hr density of available battery technology has stagnated, the inclusion of a higher power density battery in a given size is no longer the answer to support the additional functionality. To further complicate matters, the demand placed on batteries as a result of the increased functionality in PCDs often leads to elevated touch temperatures of the PCD that are detrimental to user experience, if not to components within the PCD as well.

Therefore, there is a need in the art for a system and method that manages available battery capacity such that PCD functionality is optimized. Moreover, there is a need in the art for a system and method that manages battery demand in a PCD such that instantaneous battery resources are not exceeded to the detriment of QoS, user experience and mission-critical services.

SUMMARY OF THE DISCLOSURE

Various embodiments of methods and systems for managing battery load in a portable computing device ("PCD") are disclosed. Exemplary embodiments include a battery load manager ("BLM") module that seeks to monitor and analyze the average, peak and duration of battery-demand in a PCD. Based on the values of such parameters, a battery load score may be calculated for the PCD. An exemplary battery load score may consider an aggregate battery demand at a point in time, or over a period of time, attributable to any ancillary hardware (i.e. other devices) attached to the PCD and components comprised within the PCD (hardware and/or software). The BLM module, after having determined a battery load score for the PCD, may determine scalability of the battery load based, inter alia, on minimum and registered performance ratings of the various components (i.e., hardware and/or software) that are contributing to the battery load score. Based on these parameters, the BLM module may calculate a performance score quantifying the probable impact on battery load for the PCD that could result from increased demand if a call for new hardware and/or software is allowed.

Embodiments of a BLM module may review the state of voltage ("SOV") for the battery of the PCD. If additional power demand attributable to a call for new hardware and/or new software to run on the PCD is expected to create a battery-load that risks the state of health ("SOH") of the battery, then (if permitted by other hardware/software in or coupled to the PCD) the BLM module may lower battery-demand of existing hardware and/or software to allow the addition of the new hardware or software. Alternatively, in the event that the calculated performance score indicates that bringing the new hardware and/or software online may be detrimental to the battery SOH, the BLM module may deny the call for the new hardware and/or software.

One exemplary method for managing battery load in a PCD includes tracking an active load on a battery that is attributable in aggregate to one or more active power consuming components within the PCD. Measurements associated with the battery and indicative of the battery's state of health may also be monitored. When a call for additional load on the battery is recognized, such as a user request for provision of additional functionality in the PCD, a future load on the battery that includes the newly called load can be calculated or estimated. Based on an analysis of the impact on the battery's state of health should the newly called load be allowed, existing, lower priority loads may be scaled or suspended to create battery load capacity for the newly called load. In this way, quality of service ("QoS") and user experience may be optimized while minimizing conditions that could be detrimental to the battery's state of health.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
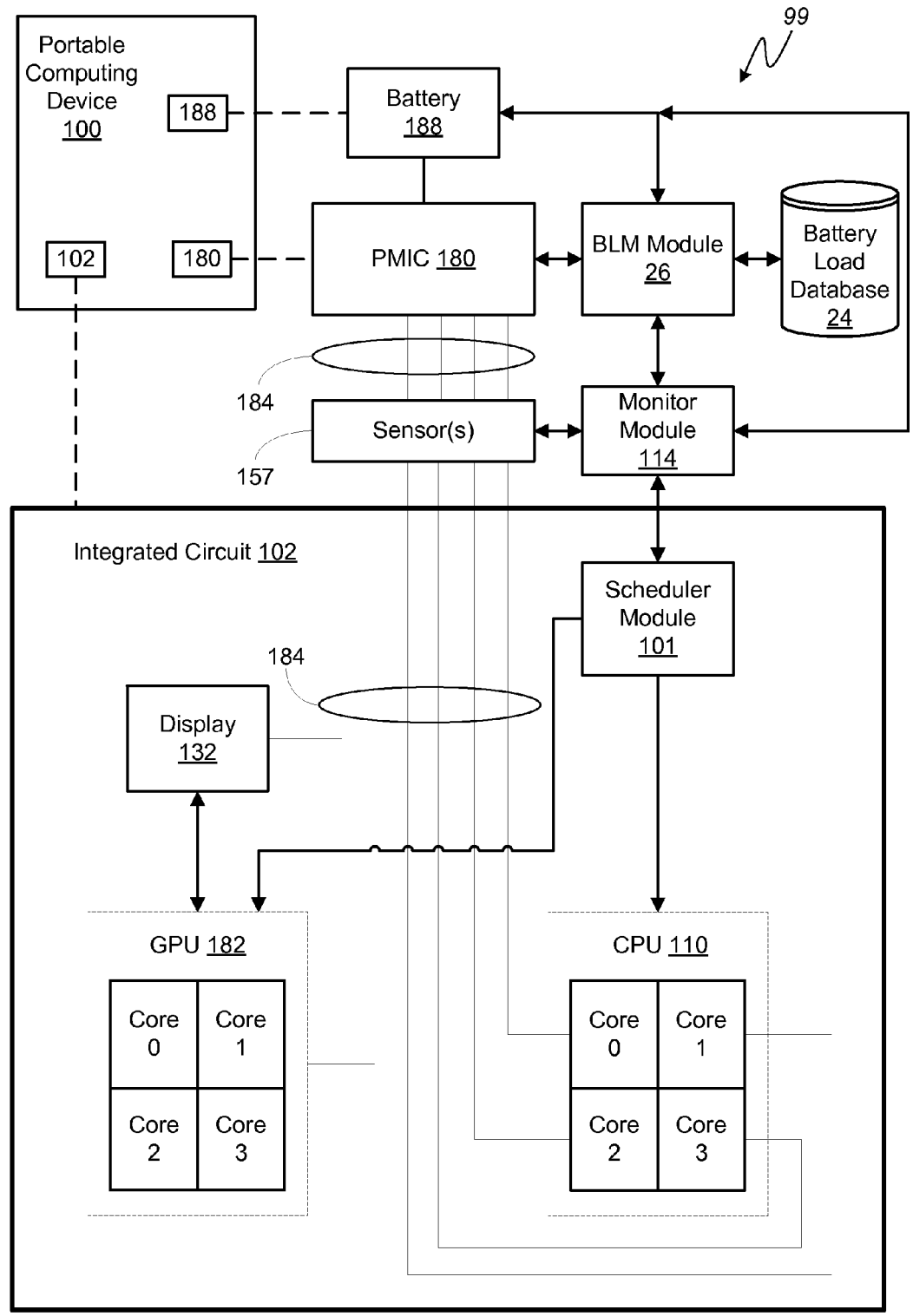
FIG. 1 is a functional block diagram illustrating an exemplary embodiment of a system for managing battery load and demand in a portable computing device ("PCD") to optimize Quality of Service ("QoS") and overall user experience.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, the term "call" refers to a request for additional resources and/or functionality in a PCD over and above that which may be running at the time of the call. As such, one of ordinary skill in the art will understand that a call may be the result of a PCD user requesting the PCD to perform some function, provide some service, generate and render some deliverable or the like. Moreover, one of ordinary skill in the art will also understand that a call for a PCD resource may be the result of a given component within the PCD leveraging another component within the PCD to complete a workload task. As a non-limiting example, a user action to open a browser application on a PCD may cause calls for additional resources/components in the PCD not in use at the time of the call such as a modem, a graphical processor and/or a display. One of ordinary skill in the art will understand that allowing a call for a component or resource may increase battery demand within a PCD.

In this description, it will be understood that the terms "thermal" and "thermal energy" may be used in association with a device or component capable of generating or dissipating energy that may be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device.

In this description, the terms "load mitigation," "load management" and the like generally refer to measures and/or techniques for optimizing battery life and performance in a PCD. It is an advantage of various embodiments that the active and historical loads on a battery may be monitored, predicted and leveraged by load management techniques to prolong battery life, maintain availability of critical services, optimize user experience and provide higher levels of quality of service.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Exemplary methods and systems generally referred to herein as battery load manager ("BLM") modules seek to monitor and analyze the average, peak and duration of battery-demand in a PCD. Based on the values of such parameters, a battery load score may be calculated for the PCD. An exemplary battery load score may consider an aggregate battery demand at a point in time, or over a period of time, attributable to any ancillary hardware (i.e. other devices) attached to the PCD and components comprised within the PCD (hardware and/or software). A BLM module, after having determined a battery load score for the PCD, determines scalability of the battery load based, inter alia, on minimum and registered performance ratings of the various components (i.e., hardware and/or software) that are contributing to the battery load score. Based on these parameters, the BLM module may calculate a performance score quantifying the probable impact on battery load for the PCD that could result from increased demand if a call for new hardware and/or software is allowed.

A BLM module may review the state of voltage ("SOV") for the battery of the PCD. If additional power demand attributable to a call for new hardware and/or new software to run on the PCD is expected to create a battery-load that risks the state of health ("SOH") of the battery, then (if permitted by other hardware/software in or coupled to the PCD) the BLM module may lower battery-demand of existing hardware and/or software to allow the addition of the new hardware or software. Alternatively, in the event that the calculated performance score indicates that bringing the new hardware and/or software online may be detrimental to the battery SOH, the BLM module may deny the call for the new hardware and/or software.

In general, an exemplary BLM module may perform any one or more of the following functions including, but not limited to, reviewing real-time battery discharge for power profiling loads, predicting battery life and chronicling battery use, enabling optimum context-aware battery operation, monitoring SOV/state of charge ("SOC")/SOH parameters, monitoring use cases and documenting associated battery load, establishing concurrency QoS/user experience across various software and/or hardware, prolonging battery-life to maximize PCD platform availability, preserving resources within a PCD for mission-critical services, managing battery depth-of-discharge, managing battery SOH to prevent damage to the battery, maximizing cycle life of the battery, and enhancing PCD platform controllability, reliability, and security.

To prevent excessive battery voltage drop, embodiments of a BLM module may allow calls to launch or activate new software applications or hardware devices coupled to or existing within the PCD only if the combined instantaneous battery load is expected to be manageable by the battery. Similarly, to prevent thermal related anomalies, for new applications that are to be launched or existing hardware to be activated, the aggregate platform load of the PCD may be left intact by a BLM module only when platform thermal load of the PCD is expected to remain at a safe level. Otherwise, embodiments of a BLM module may negotiate reduced performance (including dismissal) for both existing applications and new application(s) queued for launch.

Certain embodiments of BLM modules leverage databases to query, update and maintain loading information associated with various components of a PCD. The loading information may include battery-loading data, temperature-rise data, etc. associated with individual components and be used by a BLM module to calculate a battery load score and/or a performance score. Notably, it is envisioned that the battery load score may also be calculated by considering real-time power load measurements. The battery load and performance scores may be indicative of user experience and, as such, may be leveraged by a BLM module to intelligently decide whether a given application should be born, scaled, or killed.

FIG. 1 is a functional block diagram illustrating an exemplary embodiment of a system 99 for managing battery load and demand in a portable computing device ("PCD") 100. The BLM module 26 may leverage knowledge of individual battery loads associated with various components in the PCD 100 to manage battery performance and prolong battery life. Advantageously, by monitoring the specific battery load of a given component, embodiments may apply load management measures using a fine grained approach which, when necessary, prioritizes components and their associated functionalities in such a way that the state of health of the battery 188 is optimized. Consequently, the quality of service ("QoS") experienced by the user of a PCD 100 may be optimized as only those components known to have the least impact on user experience may be subject to load mitigation measures.

As can be seen in the exemplary illustration of FIG. 1, a power management integrated circuit ("PMIC") 180 is configured to supply power to each of one or more exemplary processing components 110, 132 182 residing within the integrated circuit 102. As depicted, the power is sourced from the battery 188 and distributed by the PMIC 180 to each of the processing components 110, 132 182 via a number of dedicated power rails 184. Notably, in the FIG. 1 illustration, display 132 and graphical processing unit ("GPU") 182 are each depicted as having a single, associated power supply rail 184 while each of cores 0, 1, 2 and 3 of central processing unit ("CPU") 110 are depicted as having a dedicated power rail 184. Even so, one of ordinary skill in the art will recognize that any core, sub-core, sub-unit or the like within a processing component, such as components 110, 132 182, may share a common power rail with complimentary components or have a dedicated power rail 184 and, as such, the particular architecture illustrated in FIG. 1 is exemplary in nature and will not limit the scope of the disclosure.

Returning to the FIG. 1 illustration, one or more power sensors 157 are configured to monitor power rails 184 and generate a signal indicative of power consumption by the particular component(s) associated with the power rails 184. It is envisioned that the sensors 157 may be configured to monitor current and be of a type such as, but not limited to, a Hall effect type for measuring the electromagnetic field generated by current flowing through the power rail 184, a shunt resistor current measurement type for calculating current from voltage drop measured across a resistor in the power rail 184, or any type known to one of ordinary skill in the art. As such, while the particular design, type or configuration of a sensor 157 that may be used in an embodiment of the systems and methods may be novel in, and of, itself, the systems and methods are not limited to any particular type of sensor 157. For example, even though the sensors 157B depicted in the exemplary FIG. 1 illustration are shown in association with individual power rails, it is envisioned that sensors 157 in some embodiments may be configured for measuring temperature at or near a processing component, the measurement of which may be used to deduce power consumption by a given component.

A monitor module 114 may monitor and receive the signals generated by the sensor(s) 157. The monitor module 114 may also monitor the status of instructions generated by a scheduler module 101. Notably, although the monitor module 114, power sensors 157, battery load database 24 and BLM module 26 are depicted in the FIG. 1 illustration as residing off of the chip 102, one of ordinary skill in the art will recognize that any or all of components 24, 26, 114 and 157 may reside on chip 102 in certain embodiments. Moreover, one of ordinary skill in the art will recognize that, in some embodiments of a PCD 100, the monitor module 114 and/or power sensors 157 may be included in the PMIC 180, although the particular embodiment illustrated in FIG. 1 depicts the monitor module 114 and power sensors 157 as independent components.

The BLM module 26, in conjunction with the monitor module 114, as generally described above, may be configured to track calls for workloads from various processing components 110, 132 182. As one of ordinary skill in the art will recognize, embodiments of the BLM module 26 may include hardware and/or software interrupts handled by an interrupt service routine. That is, depending on the embodiment, a BLM module 26 may be implemented in hardware as a distinct system with control outputs, such as an interrupt controller circuit, or implemented in software, such as firmware integrated into a memory subsystem. In some embodiments, workloads queued for scheduling by the scheduler module 101 may be recognized by the monitor module 114 and used as triggers for alerting the BLM module 26 to assess probable impact on battery load. Even so, it will be understood that embodiments of the system and method are not limited to the use of workload queues as triggers for the timing of battery load impact analyses and/or application of battery load management techniques. As such, the embodiments described herein to leverage triggers associated with workload queues are exemplary in nature and are not meant to limit the scope of a BLM module 26. For example, it is envisioned that some embodiments may leverage triggers based on one or more of user requests in the form of a graphical user interface actuation, temperature measurements at or near power consuming components, power rail measurements, etc.

Returning to the FIG. 1 illustration, the monitor module 114 monitors a signal from one or more power sensors 157 to track power consumption of active components associated with the various rails. In some embodiments, the data tracked by the monitor module 114 may be continuously updated and stored in a battery load database such that historical power consumption levels may be mapped to particular use cases. In this way, certain embodiments of a BLM module 26 may be operable to query past power consumption data and accurately determine the impact of proposed use cases on the battery's state of health. In addition to the power sensors 157, monitor module 114 may also monitor various aspects of battery 188 including, but not limited to, real time battery discharge for power profiling loads on battery 188, predicting battery life of battery 188 and chronicling battery use. The monitor module 114 in some embodiments may also monitor depth of discharge of battery 188, state of voltage of battery 188, state of charge of battery 188 and various indicators of overall QoS and user experience of PCD 100. The monitor module 114 may subsequently communicate with the BLM module 26 and battery load database 24 to relay the monitored data indicative of battery state of health and/or active power consumption within the PCD 100. Advantageously, the BLM module 26 may leverage the monitored data to quantify an active load on the battery 188 and predict the impact on that load should call(s) for additional resources be allowed. Once the active load on the battery 188 is compared to the predicted load attributable to called resources/components, the BLM module 26 may implement battery load management techniques designed to optimize one or more of battery life, state of health, critical services availability, etc.

In some embodiments, the BLM module 26 may reference the battery load database 24 for determining the probable impact on battery load of called components. Once the battery load impact of a called component is recognized by the BLM module 26, battery load management and/or mitigation policies for optimizing user experience and QoS may be applied to the PCD workload.

As a non-limiting example, a user of PCD 100 may request functionality that causes scheduler module 101 to queue a workload instruction to core 0 of CPU 110. The monitor module 114 may recognize that the instruction has been initiated and alert BLM module 26 to evaluate the impact of the requested workload on battery 188. Querying battery load database 24 or, in some embodiments, aggregating active power measurements from data collected by sensors 157, the BLM module 26 may quantify a battery load score attributable to the active load or ongoing use case in PCD 100. The BLM module 26, again querying battery load database 24 for data indicative of battery load levels associated with core 0, may quantify a probable impact on battery load should the requested workload instruction be processed. In the event that the additional load associated with the workload instruction to core 0 is determined to have a detrimental impact on the state of health of battery 188, the BLM module 26 may deny the request to process the workload instruction or reduce active workloads such that the new instruction can be accommodated.

As a non-limiting example, BLM module 26 may reduce power to display 132, thereby dimming display 132 such that it consumes less power, in order to reallocate battery load capacity to accommodate a call for functionality associated with RF transceiver 168 (not shown in FIG. 1). To further the example, BLM module 26 may have recognized that the activation of RF transceiver 168 to the use case active in PCD 100 would cause the voltage of battery 188 to drop below a level capable of supporting critical services. And, as such, may have elected via implementation of a battery load management technique to reduce the brightness of display 132 so that battery capacity may be allocated to RF transceiver 168 without over-impacting QoS and user experience.

Notably, in some embodiments, the data in the battery load database 24 may be empirically collected based on power consumption rates previously monitored in association with known use cases. In other embodiments, the data in the battery load database 24 may have been calculated on an a-priori basis. In still other embodiments, the data in the battery load database 24 may have been calculated on an a-priori basis and continually updated based on actual power consumption measurements monitored in PCD 100. Regardless of how the data within a battery load database 24 may have been derived or collected, one of ordinary skill in the art will recognize that embodiments of a battery load database 24 may be queried for evaluating actual and predicted battery load impacts and, beyond such function, are not limiting on the scope of the systems and embodiments disclosed.

Figure 2:
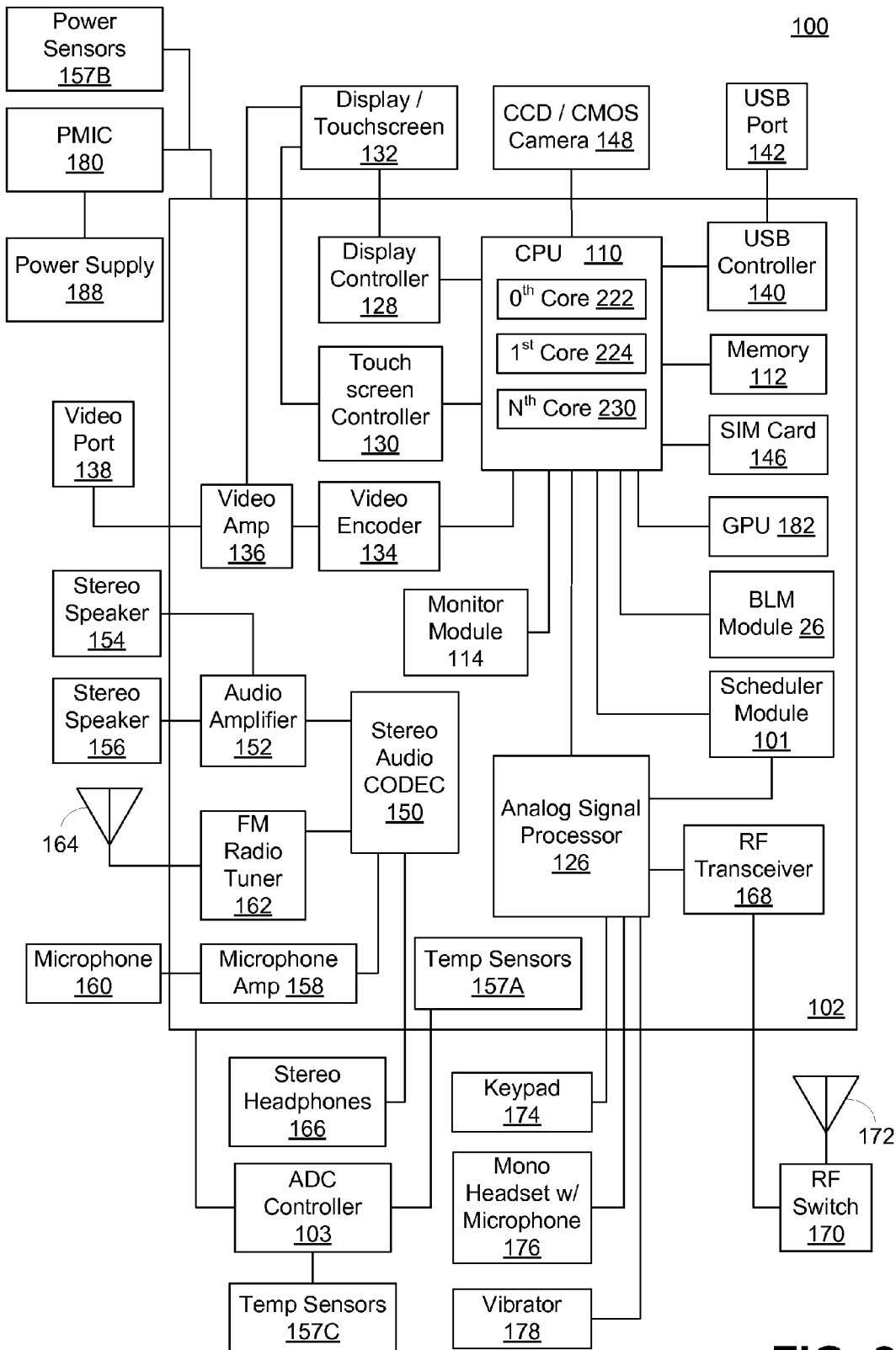
FIG. 2 is a functional block diagram of an exemplary, non-limiting aspect of a PCD in the form of a wireless telephone for implementing methods and systems for managing battery load and demand to optimize QoS and overall user experience.

FIG. 2 is a functional block diagram of an exemplary, non-limiting aspect of a PCD 100 in the form of a wireless telephone for implementing methods and systems for managing battery load and demand to optimize Quality of Service ("QoS") and overall user experience. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the battery load management ("BLM") module 26, in conjunction with the monitor module 114, may be responsible for monitoring battery loads, predicting impacts on battery loads and applying battery load management techniques to help a PCD 100 optimize its power supply and maintain a high level of functionality.

The monitor module 114 communicates with multiple operational sensors (e.g., thermal sensors 157A) distributed throughout the on-chip system 102 and with the CPU 110 of the PCD 100 as well as with the BLM module 26. In some embodiments, monitor module 114 may also monitor power sensors 157B for power consumption rates uniquely associated with the cores 222, 224, 230 and transmit the power consumption data to the BLM module 26 and/or battery load database 24 (which may reside in memory 112). The BLM module 26 may work with the monitor module 114 to identify use case conditions that may warrant application of one or more battery load management techniques to identified components within chip 102.

As illustrated in FIG. 2, a display controller 128 and a touch screen controller 130 are coupled to the digital signal processor 110. A touch screen display 132 external to the on-chip system 102 is coupled to the display controller 128 and the touch screen controller 130. A BLM module 26 may monitor workload queues for the cores 222, 224, 230, for example, and work with PMIC 180 to manage power provided to the cores from power supply 188. The monitor module 114 may monitor current measurements on power rails from the PMIC 180 to components of the on-chip system 102 and provide those measurements to BLM module 26 for calculation of active battery loads. Advantageously, by quantifying active power loads the BLM module 26 may predict the impact on battery state of health resulting from calls for additional functionality/workloads on one or more components within PCD 100.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 through PMIC 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157C may be employed without departing from the scope of the invention.

The thermal sensors 157A, 157C, in addition to being controlled and monitored by an ADC controller 103, may also be controlled and monitored by one or more BLM module(s) 26. The BLM module(s) 26 may comprise software which is executed by the CPU 110. However, the BLM module(s) 26 may also be formed from hardware and/or firmware without departing from the scope of the invention. The BLM module(s) 26 may be responsible for monitoring and applying battery load policies that include one or more battery load management techniques that may help a PCD 100 avoid overburdening its power supply while maintaining a high level of functionality and user experience.

As an example, embodiments of a BLM module 26 in conjunction with a monitoring module 114 may track temperature measurements associated with one or more power consuming components. Advantageously, by tracking temperatures associated with various components, a BLM module 26 may be able to identify thermal aggressors within PCD 100 that could negatively impact user experience by elevating touch temperatures of PCD 100. Recognizing the elevated temperatures, a BLM module 26 may be able to mitigate excess thermal energy generation by denying calls for additional resources that would increase power demand at the identified thermal aggressor. Similarly, embodiments of a BLM module 26 may track temperatures associated with the battery 188 itself and apply battery load mitigation techniques in the event that temperatures associated with the battery 188 reach levels detrimental to the health of the battery 188.

Returning to FIG. 2, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more BLM module(s) 26. These instructions that form the BLM module(s) 26 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 3:
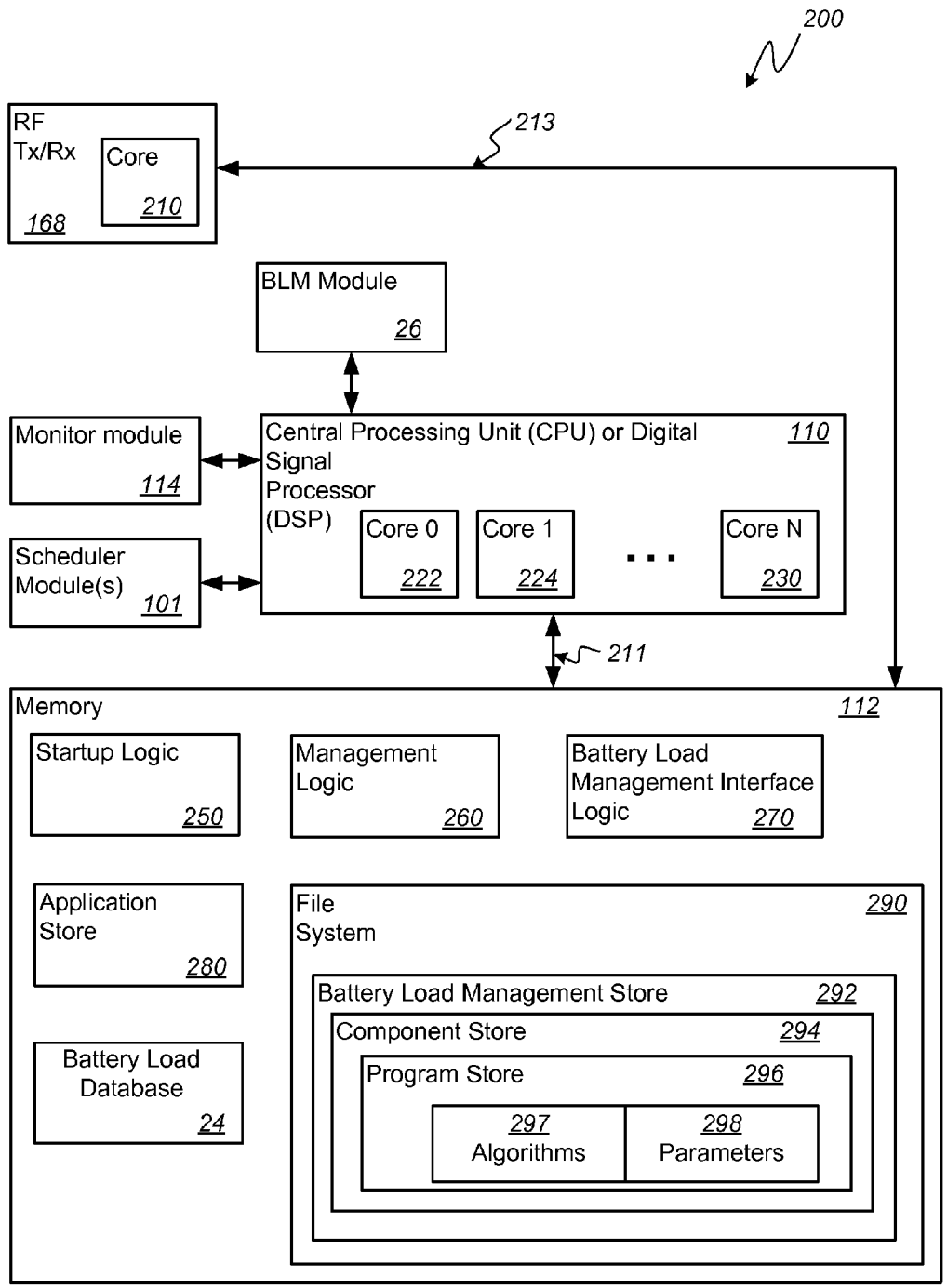
FIG. 3 is a schematic diagram illustrating an exemplary software architecture of the PCD of FIG. 2 for supporting battery load monitoring and application of algorithms associated with battery load management techniques.

FIG. 3 is a schematic diagram illustrating an exemplary software architecture of the PCD 100 of FIG. 2 for supporting battery load monitoring and application of algorithms associated with battery load management techniques. Any number of algorithms may form or be part of at least one battery load management technique that may be applied by the battery load manager module 26 when certain load conditions or use case scenarios are met and additional functionality or resources are called into execution.

As illustrated in FIG. 3, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs may be distributed for processing across two or more of the available cores. Notably, although the execution of battery load management techniques are described relative to the FIG. 3 illustration in connection with executing, scaling or killing workloads running on CPU 110 or core 210, one of ordinary skill in the art will recognize that application of such techniques may advantageously execute, scale or kill workloads on any component within PCD 100 that contributes to an aggregate battery load on battery 188.

The CPU 110 may receive commands from the BLM module(s) 26 that may comprise software and/or hardware. If embodied as software, the BLM module 26 comprises instructions that are executed by the CPU 110 that issues commands to other application programs being executed by the CPU 110 and other processors. For example, the BLM module 26 may instruct CPU 110 to cause a certain active application program to cease so that excess battery capacity may be allocated to serve a user's call for alternative functionality.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 168 is implemented via digital circuit elements and includes at least one processor such as the core processor 210 (labeled "Core"). In this digital implementation, the RF transceiver 168 is coupled to the memory 112 via bus 213. Returning to the example above, a BLM module 26 seeking to accommodate a user's call for functionality may cause CPU 110 to instruct core 210 to shut down RF transceiver 168. Advantageously, by doing so, the BLM module 26 may be able to accommodate a call for functionality that otherwise could not have been supported by the power source 188.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the PCD 100 is implemented in software, as is shown in FIG. 3, it should be noted that one or more of startup logic 250, management logic 260, battery load management interface logic 270, applications in application store 280, data associated with battery load database 24 and portions of the file system 290 may be stored on any computer-readable medium for use by or in connection with any computer-related system or method.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a "computer-readable medium" may be any means that can store, communicate, propagate, or transport the program for use by or in connection with the instruction execution system, apparatus, or device.

The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program may be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the battery load management interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 168.

In one exemplary embodiment for monitoring and managing battery loads to optimize user experience and QoS, the startup logic 250 includes one or more executable instructions for selectively identifying, loading, and executing a select program for managing battery loads of one or more of the available components in PCD 100 such as the first core 222, the second core 224 through to the $N^{th}$ core 230. A select program may be found in the program store 296 of the embedded file system 290 and is defined by a specific combination of a performance scaling algorithm 297 and a set of parameters 298. The select program, when executed by one or more of the core processors in the CPU 110 and the core 210 in the RF transceiver 168, may operate in accordance with one or more signals provided by the monitor module 114 in combination with control signals provided by the one or more BLM module(s) 101 to scale or suspend the performance of the respective processor core in an effort to mitigate demand on the battery 188.

The management logic 260 includes one or more executable instructions for terminating a battery load management program on one or more of the respective processor cores, as well as selectively identifying, loading, and executing a more suitable replacement program for managing or controlling the power draw of one or more of the available cores based on an updated battery load score. The management logic 260 is arranged to perform these functions at run time or while the PCD 100 is powered and in use by an operator of the device. A replacement program may be found in the program store 296 of the embedded file system 290.

The replacement program, when executed by one or more of the core processors in the digital signal processor or the core 210 in the RF transceiver 168, may operate in accordance with one or more signals provided by the monitor module 114 or one or more signals provided on the respective control inputs of the various processor cores to scale or suspend the performance of the respective processor core. In this regard, the monitor module 114 may provide one or more indicators of events, processes, applications, resource status conditions, elapsed time, temperature, current leakage, etc in response to control signals originating from the BLM module 26.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active. As another non-limiting example, the inputs may include data in battery load database 24 associated with individual component performance such as, but not limited to, battery demand, average battery load, peak battery load, etc.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280, data in the battery load database 24 or information in the embedded file system 290 may be edited, replaced, or otherwise modified. In some embodiments, the interface logic 270 may permit an end user or operator of the PCD 100 to search, locate, modify or replace the startup logic 250, the management logic 260, applications in the application store 280, data in the battery load database 24 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged battery load management store 292. In this regard, the file system 290 may include a reserved section of its total file system capacity for the storage of information for the configuration and management of the various parameters 298 and battery load management algorithms 297 used by the PCD 100. As shown in FIG. 3, the store 292 includes a component store 294, which includes a program store 296, which includes one or more battery load management programs.

Figure 4:
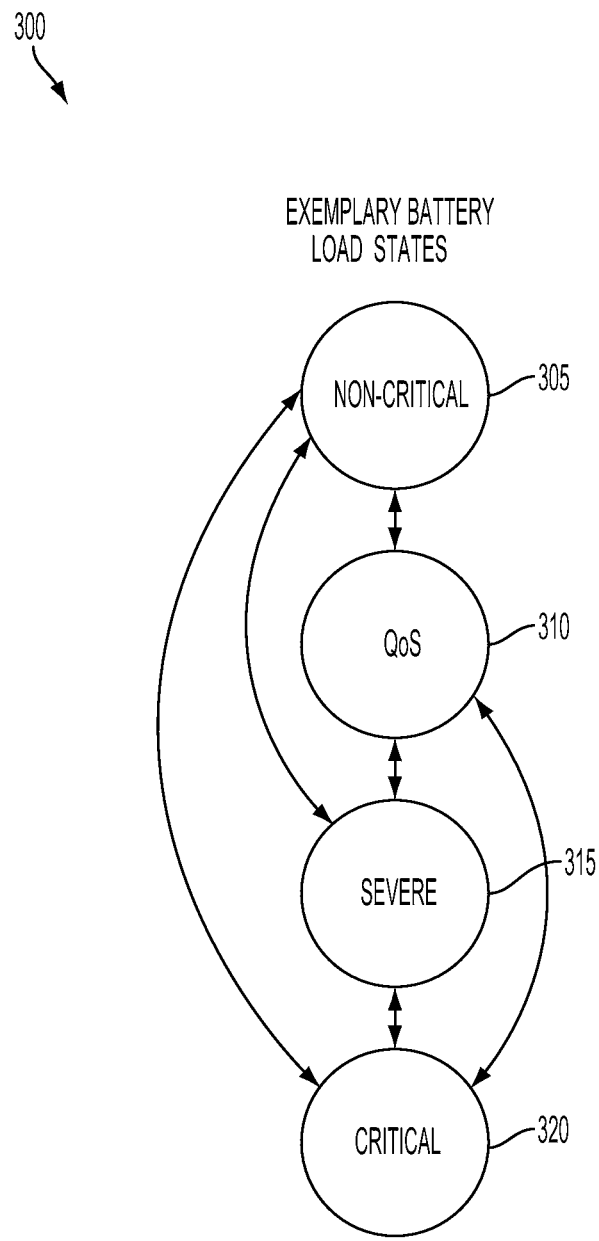
FIG. 4 is an exemplary state diagram that illustrates various battery load states that may be associated with the aggregate battery demand of components within a PCD and recognized and managed to optimize QoS and overall user experience.

FIG. 4 is an exemplary state diagram 300 that illustrates various battery load states 305, 310, 315, and 320 that may be associated with the aggregate battery demand of components within a PCD 100 and recognized and managed by the BLM module 26 in conjunction with the monitoring module 114.

The first battery load state 305 may comprise a "normal" state in which the battery load management policy of the BLM module 26 remains unchanged. In this exemplary first and normal state 305, the battery 188 is operating at a high state of voltage and is usually not in any danger or risk of reaching critical temperatures or rate of discharge that may cause failure or severe degradation. In this exemplary state, the aggregate battery load may be well under the capacity of the battery 188 such that calls for additional resources and/or functionality in PCD 100 could be accommodated without risking the health of the battery 188.

The second battery load state 310 may comprise a "quality of service" or "QoS" state in which the BLM module 26 may modify its battery load management policy relative to one or more processing components of the PCD 100. This exemplary second state 310 may be reached or entered into by the BLM module 26 when the available battery load capacity cannot accommodate a call for additional functionality without jeopardizing the health of the battery 188 or the delivery of mission critical services. The threshold or magnitude of the change in the available battery load capacity which triggers this QoS state 310 may be adjusted or tailored according to a particular use case within a PCD 100. For example, a call for functionality associated with a global positioning system ("GPS") transceiver within PCD 100 may be determined by BLM module 26 to cause the aggregate battery load to exceed a predetermined threshold. In a QoS battery load state, the BLM module 26 may determine that the power consumption of other active components within PCD 100 may be scaled without significantly affecting the overall QoS or user experience. In this way, battery load capacity may be reallocated to accommodate the call for GPS functionality without jeopardizing the health of battery 188.

In the second, QoS battery load state 310 the BLM module 26 may request or it may actually perform one or more battery load management techniques in order to reduce the aggregate battery load within PCD 100. In this particular state 310, the BLM module 26 is designed to implement or request battery management techniques that may be barely perceivable by an operator and which may degrade a quality of service provided by the PCD 100 in a minimal fashion. Further details about this second, QoS battery load state 310 will be described below in connection with FIG. 5.

The third battery load state 315 may comprise a "severe" state in which the BLM module 26 requests and/or applies more aggressive battery load management techniques relative to the second, QoS state 310 described above. This means that in this state the BLM module 26 is less concerned about quality of service from the perspective of the operator. In this battery load state, the BLM module 26 is more concerned about mitigating or reducing overall battery load in order to decrease temperature of the PCD 100, preserve battery cycle life, reduce risk to battery state of health, etc. In this third battery load state 315, one or more components of a PCD 100 may be scaled or killed such that the implications are readily perceived or observed by an operator. The third, severe battery load state 315 and its corresponding battery load management techniques applied or triggered by the BLM module 26 will be described in further detail below in connection with FIG. 5.

Similar to the first battery load state 305 and second battery load state 310 as discussed above, this third and severe battery load state 315 may be initiated based upon power measurements by sensors 157 and not necessarily limited to the identification of specific use case scenarios documented in battery load management database 24. For example, as the arrows in this diagram illustrate, each battery load state may be initiated in sequence or they may be initiated out of sequence depending upon the magnitude of the change in aggregate battery load that may be detected. So this means that the BLM module 26 may leave the first and normal battery load state 305 and enter into or initiate battery load management techniques associated with the third and severe battery load state 315 based on a change in power consumption that is detected by sensors 157, the state of health of battery 188, the depth of discharge of battery 188, the state of charge and/or state of voltage of battery 188, etc. Similarly, the PCD 100 may be in the second or QoS battery load state 310 and enter into or initiate the fourth or critical state 320 based on a recognized change in battery health or load. In this exemplary third and critical state 320, the BLM module 26 may be applying or triggering as many and as sizable battery load management techniques as possible in order to avoid reaching one or more critical levels of current leakage that may result in temperatures that cause permanent damage to the battery or one or more components contained within the PCD 100.

This fourth and critical battery load state 320 may be similar to conventional techniques that are designed to eliminate functionality and operation of a PCD 100 in order to avoid critical temperatures or permanent damage to the battery 188 and/or components within PCD 100. The fourth battery load state 320 may comprise a "critical" state in which the BLM module 26 applies or triggers the shutting down of nonessential hardware and/or software. The fourth and critical thermal state 320 will be described in further detail below in connection with FIG. 5.

The battery load policy management system is not limited to the four battery load states 305, 310, 315, and 320 illustrated in FIG. 4. Depending upon a particular PCD 100, additional or fewer battery load states may be provided without departing from the scope of the invention. That is, one of ordinary skill in the art will recognize that additional battery load states may improve functionality and operation of a particular PCD 100 while in other situations fewer battery load states may be preferred for a particular PCD 100 that has its own unique hardware and/or software.

Figure 5:
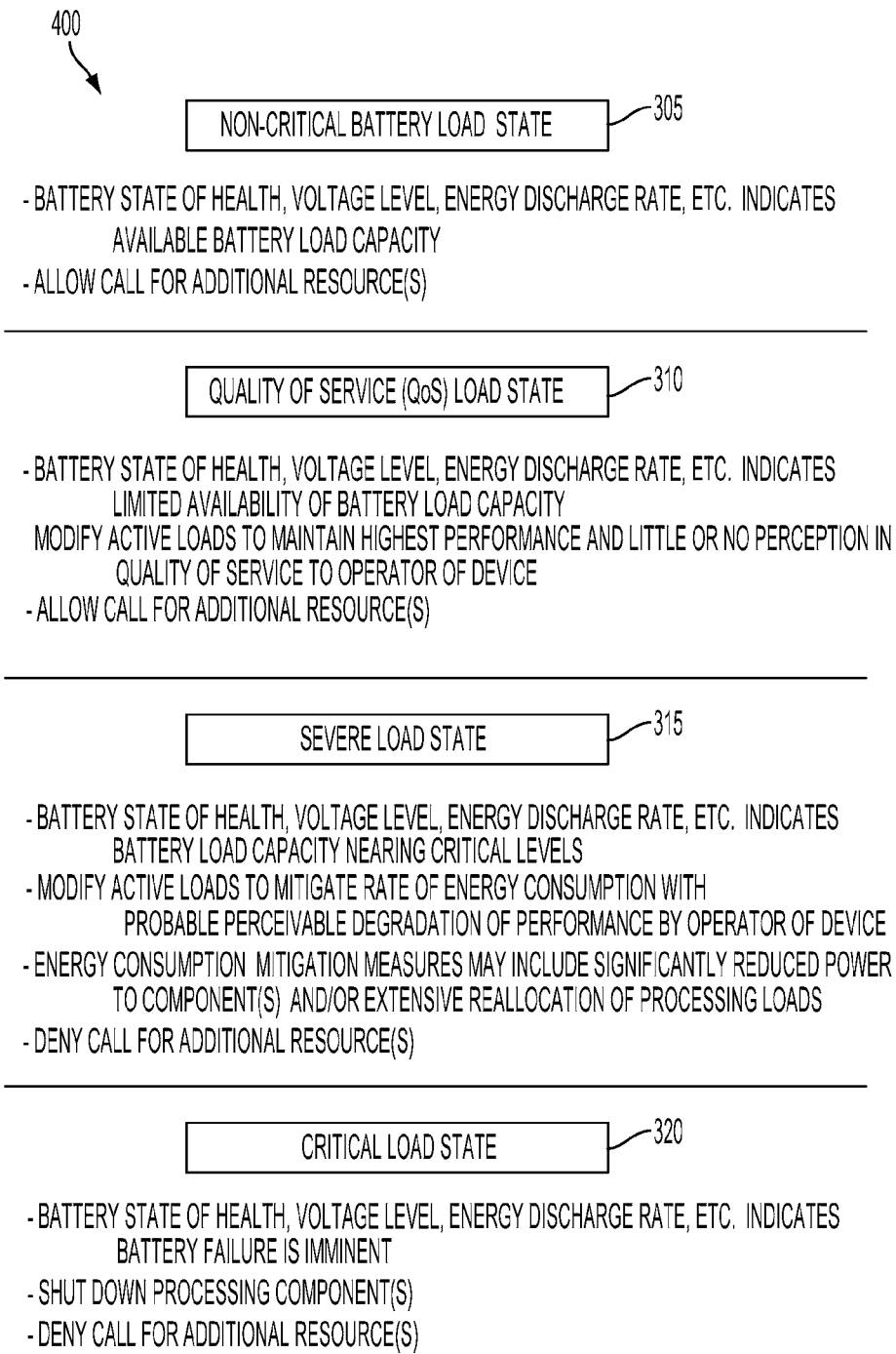
FIG. 5 is a diagram illustrating exemplary battery load management techniques that may be applied to optimize QoS and overall user experience and are dependent upon a particular battery load state of a PCD.

FIG. 5 is a diagram illustrating exemplary battery load management techniques that may be applied or ordered by the BLM module 26 and are dependent upon a particular battery load state of a PCD 100. It should be appreciated that the battery load management techniques described herein may be applied to manage power loads associated with any type of processing, but may be particularly useful in situations involving graphics processing due to inherent power demands, system requirements, and importance to the overall user experience of the PCD 100.

As noted previously, in this first battery load state 305, a battery 188 of a PCD 100 may not be in any danger or risk of exceeding its power capacity such calls for additional functionality are denied or active components scaled. Usually, in this first battery load state, the BLM module 26 is not applying or has not requested any initiation of battery load management techniques such that the functionality of the PCD 100 is operating at its fullest potential and highest performance. The battery's state of health, voltage levels, energy discharge rate and the like indicate that additional battery load capacity is available. Accordingly, calls for additional functionality may be accommodated.

In the second battery load state 310, also referred to as the QoS state 310, once it is initiated, the BLM module 26 may initiate or request battery load management techniques but with the objective to maintain high-performance with little or no perception in degradations to the quality of service as perceived by the operator of the PCD 100. The battery's state of health, voltage levels, energy discharge rate and the like indicate limited availability of battery capacity for additional functionality beyond the functionality being actively provided. Calls for additional functionality may trigger the BLM module 26 to modify active loads by scaling or suspending power consumption by one or more active components in order to reallocate the power load to components needed to accommodate calls for additional functionality. In this state, functionalities of the PCD 100 may be prioritized such that battery load capacity is allocated in such a way that user experience remains high.

Referring now to the third battery load state 315 of FIG. 5, also known as the severe battery load state 315, the BLM module 26 may apply or request more aggressive battery load management techniques with probable perceivable degradation of performance observed by an operator of the PCD 100. According to this exemplary battery load state 315, the BLM module 26 may cause reduction in power to one or more components like GPU 182 and or cores of CPU 110. The BLM module 26 may also bring active devices off-line in favor of bringing critical inactive devices on-line. Essentially, the battery load management techniques of this third and severe battery load state 315 may be the same as those described above with respect to the second, quality of service battery load state 310. However, these same battery load management techniques may be applied in a more aggressive manner. Calls for additional functionality in the PCD 100 may be outright denied in favor of conserving power capacity for more critical active components or preserving the health of battery 188.

Referring now to the fourth and critical battery load state 320 of FIG. 5, the BLM module 26 may start shutting down all nonessential hardware and/or software modules. "Nonessential" hardware and/or software modules may be different for each type of particular PCD 100. According to one exemplary embodiment, all nonessential hardware and/or software modules may include all of those outside of an emergency 911 telephone call function and global positioning system ("GPS") functions. This means that the BLM module 26 in this fourth, critical battery load state 320 may cause the shutdown of components that do not affect emergency 911 telephone calls and GPS functionality. The BLM module 26 may shut down modules in sequence and/or in parallel depending upon the critical temperatures or battery state of health being monitored by the monitor module 114.

Figure 6A:
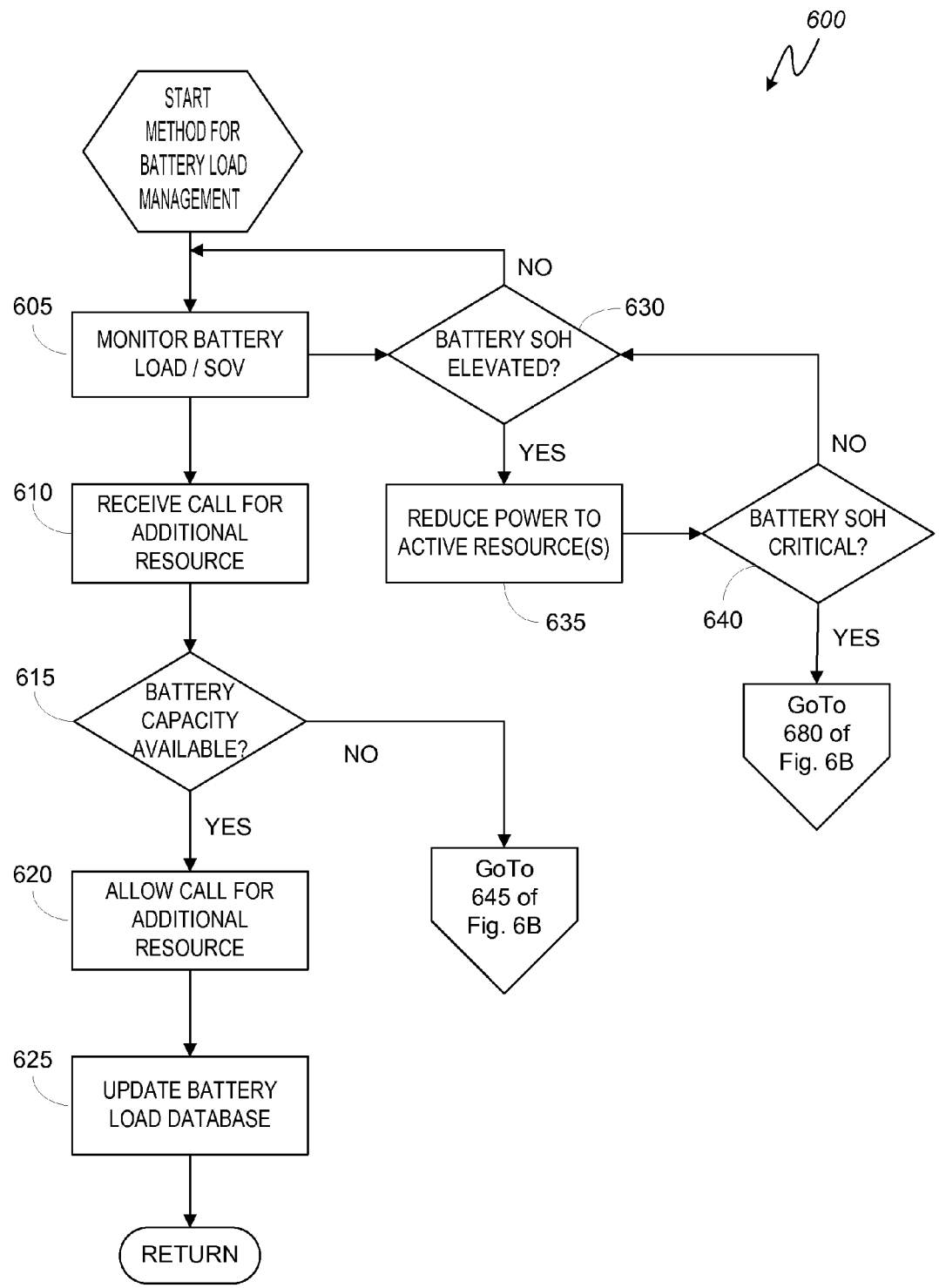
FIGS. 6A-6B is a logical flowchart illustrating a method for managing battery load and demand in a PCD.
Figure 6B:
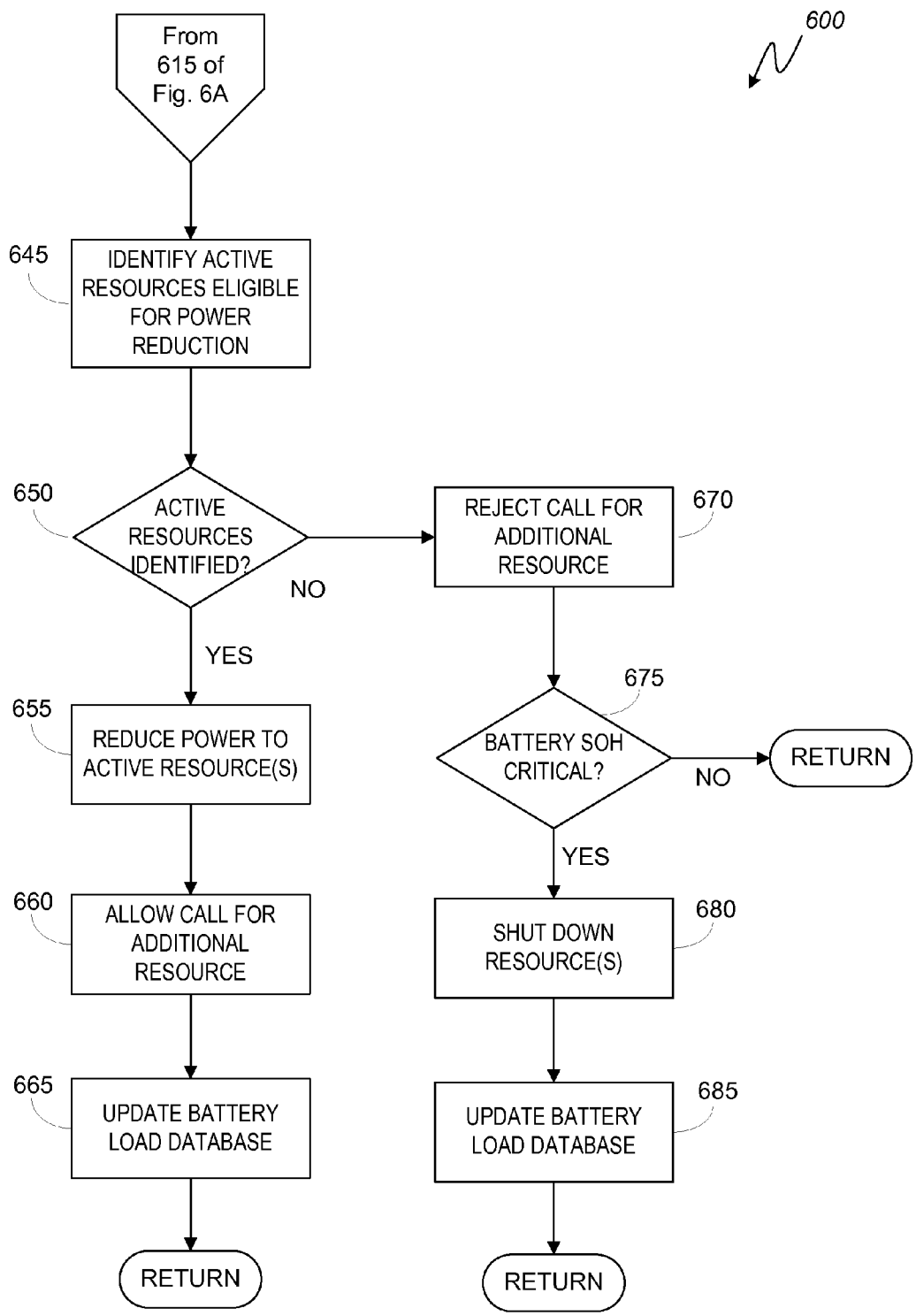

FIG. 6A-6B is a logical flowchart illustrating a method 600 for managing battery load and demand in a PCD 100. Method 600 of FIG. 6 starts with a first block 605 in which the BLM module 26 in conjunction with the monitor module 114 track the active battery load and/or state of voltage of the battery 188. Notably, by tracking the active battery load and/or state of voltage of the battery 188, a baseline battery load score may be established. Monitoring at block 605 may include, but is not limited to including, documenting active components within PCD 100 that are contributing to battery demand, battery demand, average battery load, peak battery load, minimum required battery demand for active components, historical demand for various components under certain use cases, registered performance of various components, scalability of components, alarms history, state of battery charge, depth of battery discharge, rate of discharge, etc.

At block 610, a call for an additional resource or functionality in PCD 100 may be received or recognized by the BLM module 26. At decision block 615, the battery load score calculated at block 605 may be analyzed to determine whether the additional load associated with the called resource would cause the battery demand, whether peak or for a duration, to exceed a predetermined threshold. If battery capacity is determined to be adequate to accommodate the new resource, then the "yes" branch is followed to block 620 and the additional resource is allowed to come online. Subsequently, at block 625, the battery load database 24 may be updated to reflect the newly active resource. Notably, with regards to battery load database 24, the BLM module 26 may leverage the database to determine any number of things including, but not limited to, the impact that a newly called resource may have on aggregate battery load, the historical impact of certain use cases on the battery state of health, the current combination of active components within PCD 100, etc.

Returning to decision block 615, if the BLM module 26 determines that there is not sufficient battery capacity to accommodate the newly called resource, the "no" branch is followed to block 645 of FIG. 6B. Notably, one of ordinary skill in the art will recognize that the reference to "sufficient" or "insufficient" battery capacity herein may refer to the state of voltage of the battery 188 but is not limited as such. For example, battery capacity as determined by a BLM module 26 may be quantified in terms of overall battery health, depth of discharge, active rate of discharge, charge recovery rate, state of current and the like. As such, the selection and implementation of a given battery management technique by a BLM module 26 will be understood to be dictated by any quantifiable aspect of a battery 188 as may be leveraged by a given embodiment.

At block 645, active components eligible for power reduction, scaling or suspension may be identified. Identification of such components may be the result of BLM module 26 querying battery load management database 24 to analyze aspects of active components or, in some embodiments, may be the result of leveraging power sensors to identify active components and associated power draw levels. At decision block 650, if active components or resources eligible for power scaling without significantly impacting QoS or user experience of PCD 100 are identified, then the "yes" branch is followed to block 655 and power to those identified resources is reduced accordingly. Notably, reduction in the power to the identified resources may free up battery load capacity that could be reallocated to the newly called resource from block 610 and, at block 660, the call for the resource may be allowed. In this way, one of ordinary skill in the art will recognize that the available battery capacity is efficiently allocated to optimize user experience without jeopardizing the health of the battery 188 and/or sacrificing the availability of critical resources on PCD 100. At block 665, the battery load management database 24 is updated to reflect the active allocation of power.

Returning to decision block 650, if no active resources eligible for power reduction are identified, then the "no" branch is followed to block 670 and the call for additional functionality from block 610 is rejected. The battery state of health may determined at decision block 675 and, if determined to be at a safe level, then the process returns to the state of monitoring at block 605. If, however, the battery state of health is determined to be nearing, at or exceeding a predetermined threshold, then the "yes" branch is followed to block 680 and one or more resources are suspended or shut down altogether. In this way, excess burden that could be detrimental to the overall health of battery 188 may be removed. At block 685 the battery load database 24 is updated to reflect the actions taken by the BLM module 26 and the process returns to monitoring at block 605.

Returning to block 605, the battery load is continually monitored to establish a battery load score for determining the feasibility of accommodating newly called resources at block 610. However, if it is determined at decision block 630 that the battery load score is elevated beyond a predetermined threshold, then the "yes" branch may be followed to block 635 and power reduced to active resources. The battery load score may then be reassessed at decision block 640 and if the state of health of the battery is deemed critical, then the "yes" branch is followed to block 680 where resources may be selected for suspension of power supply or outright shutting down. If the state of health is not critical, i.e. the reduction of power at block 635 sufficiently removed burden from the battery 188, then the "no" branch may be returned to decision block 630 where the battery state of health is analyzed against a predetermined threshold for elevated concern. This cycle of reducing and/or shutting down power consuming components may continue until the battery state of health is no longer in jeopardy. The "no" branch from decision block 630 is followed back to block 605 and the battery demand is monitored in anticipation of receiving a call for an additional resource.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing battery load in a portable computing device ("PCD"), the method comprising:
    tracking an active load on a battery in the PCD, wherein the active load is associated with one or more active power consuming components within the PCD;
    monitoring a state of health of the battery, wherein the state of health is quantified by one or more measurements associated with the battery;
    storing data in a battery load database that identifies the one or more active power consuming components, the state of health quantified by the one or more measurements associated with the battery, a pre-defined battery load state, and historical power consumption levels mapped to particular use cases;
    recognizing a call for additional load on the battery, wherein the call for additional load is associated with a request for functionality of the PCD that requires activation of an inactive component within the PCD;
    calculating a future active load on the battery that would result from accepting the call for additional load by querying the battery load database; and
    responding to the call for additional load on the battery based on an analysis of an impact that the future active load would have on the state of health of the battery stored in the battery load database and on the pre-defined battery load state stored in the battery load database compared with the future active load, wherein responding to the call for additional load further comprises reducing power to one or more of the active power consuming components within the PCD identified as thermal aggressors, the PCD includes a plurality of cores and responding to the call for additional load further comprises reallocating at least one processing load among at least some of the plurality of cores.

2. The method of claim 1, wherein responding to the call for additional load comprises allowing the call for additional load.

3. The method of claim 2, wherein responding to the call for additional load further comprises reducing power to one or more of the active power consuming components within the PCD.

4. The method of claim 2, wherein responding to the call for additional load further comprises suspending power to one or more of the active power consuming components within the PCD.

5. The method of claim 1, wherein responding to the call for additional load comprises rejecting the call for additional load.

6. The method of claim 1, wherein measurements associated with the battery and used to quantify the state of health comprise a state of voltage measurement.

7. The method of claim 1, wherein measurements associated with the battery and used to quantify the state of health comprise a state of charge measurement.

8. The method of claim 1, wherein measurements associated with the battery and used to quantify the state of health comprise a rate of discharge measurement.

9. A computer system for managing battery load in a portable computing device ("PCD"), the system comprising:
    a monitor module for:
        tracking an active load on a battery in the PCD, wherein the active load is associated with one or more active power consuming components within the PCD; and
        monitoring a state of health of the battery, wherein the state of health is quantified by one or more measurements associated with the battery;
    a battery load database for:
        storing data that identifies the one or more active power consuming components, the state of health quantified by the one or more measurements associated with the battery, a pre-defined battery load state, and historical power consumption levels mapped to particular use cases; and
    a battery load management module for:
        recognizing a call for additional load on the battery, wherein the call for additional load is associated with a request for functionality of the PCD that requires activation of an inactive component within the PCD;
        calculating a future active load on the battery that would result from accepting the call for additional load by querying the battery load database; and
        responding to the call for additional load on the battery based on an analysis of an impact that the future active load would have on the state of health of the battery stored in the battery load database and on the pre-defined battery load state stored in the battery load database compared with the future active load, wherein responding to the call for additional load further comprises reducing power to one or more of the active power consuming components within the PCD identified as thermal aggressors, the PCD includes a plurality of cores and responding to the call for additional load further comprises reallocating at least one processing load among at least some of the plurality of cores.

10. The computer system of claim 9, wherein the battery load management module responding to the call for additional load comprises allowing the call for additional load.

11. The computer system of claim 10, wherein the battery load management module responding to the call for additional load further comprises reducing power to one or more of the active power consuming components within the PCD.

12. The computer system of claim 10, wherein the battery load management module responding to the call for additional load further comprises suspending power to one or more of the active power consuming components within the PCD.

13. The computer system of claim 9, wherein the battery load management module responding to the call for additional load comprises rejecting the call for additional load.

14. The computer system of claim 9, wherein the monitor module monitoring the state of health of the battery comprises monitoring a state of voltage measurement.

15. The computer system of claim 9, wherein the monitor module monitoring the state of health of the battery comprises monitoring a state of charge measurement.

16. The computer system of claim 9, wherein the monitor module monitoring the state of health of the battery comprises monitoring a rate of discharge measurement.

17. A computer system for managing battery load in a portable computing device ("PCD"), the system comprising:
 means for tracking an active load on a battery in the PCD, wherein the active load is associated with one or more active power consuming components within the PCD;
 means for monitoring a state of health of the battery, wherein the state of health is quantified by one or more measurements associated with the battery;
 means for storing data in a battery load database that identifies the one or more active power consuming components, the state of health quantified by the one or more measurements associated with the battery, a pre-defined battery load state, and historical power consumption levels mapped to particular use cases;
 means for recognizing a call for additional load on the battery, wherein the call for additional load is associated with a request for functionality of the PCD that requires activation of an inactive component within the PCD;
 means for calculating a future active load on the battery that would result from accepting the call for additional load by querying the battery load database; and
 means for responding to the call for additional load on the battery based on an analysis of an impact that the future active load would have on the state of health of the battery stored in the battery load database and on the pre-defined battery load state stored in the battery load database compared with the future active load, wherein the means for responding to the call for additional load further comprises means for reducing power to one or more of the active power consuming components within the PCD identified as thermal aggressors, the PCD includes a plurality of cores, and the means for responding to the call for additional load further comprises means for reallocating at least one processing load among at least some of the plurality of cores.

18. The computer system of claim 17, wherein the means for responding to the call for additional load comprises means for allowing the call for additional load.

19. The computer system of claim 18, wherein the means for responding to the call for additional load further comprises means for reducing power to one or more of the active power consuming components within the PCD.

20. The computer system of claim 18, wherein the means for responding to the call for additional load further comprises means for suspending power to one or more of the active power consuming components within the PCD.

21. The computer system of claim 17, wherein the means for responding to the call for additional load comprises means for rejecting the call for additional load.

22. The computer system of claim 17, wherein the means for monitoring the state of health of the battery comprises means for monitoring a state of voltage.

23. The computer system of claim 17, wherein the means for monitoring the state of health of the battery comprises means for monitoring a state of charge.

24. The computer system of claim 17, wherein the means for monitoring the state of health of the battery comprises means for monitoring a rate of discharge.

25. A computer program product comprising a non-transitory machine-readable storage medium having a computer readable program code embodied therein, said computer readable program code adapted to be executed to implement a method for managing battery load in a portable computing device ("PCD"), said method comprising:
 tracking an active load on a battery in the PCD, wherein the active load is associated with one or more active power consuming components within the PCD;
 monitoring a state of health of the battery, wherein the state of health is quantified by one or more measurements associated with the battery;
 storing data in a battery load database that identifies the one or more active power consuming components, the state of health quantified by the one or more measurements associated with the battery, a pre-defined battery load state, and historical power consumption levels mapped to particular use cases;
 recognizing a call for additional load on the battery, wherein the call for additional load is associated with a request for functionality of the PCD that requires activation of an inactive component within the PCD;
 calculating a future active load on the battery that would result from accepting the call for additional load by querying the battery load database; and
 responding to the call for additional load on the battery based on an analysis of an impact that the future active load would have on the state of health of the battery stored in the battery load database and on the pre-defined battery load state stored in the battery load database compared with the future active load, wherein responding to the call for additional load further comprises reducing power to one or more of the active power consuming components within the PCD identified as thermal aggressors, the PCD includes a plurality of cores and responding to the call for additional load further comprises reallocating at least one processing load among at least some of the plurality of cores.

26. The computer program product of claim 25, wherein responding to the call for additional load comprises allowing the call for additional load.

27. The computer program product of claim 26, wherein responding to the call for additional load further comprises reducing power to one or more of the active power consuming components within the PCD.

28. The computer program product of claim 26, wherein responding to the call for additional load further comprises suspending power to one or more of the active power consuming components within the PCD.

29. The computer program product of claim 25, wherein responding to the call for additional load comprises rejecting the call for additional load.

30. The computer program product of claim 25, wherein measurements associated with the battery and used to quantify the state of health comprise a state of voltage measurement.

31. The computer program product of claim 25, wherein measurements associated with the battery and used to quantify the state of health comprise a state of charge measurement.

32. The computer program product of claim 25, wherein measurements associated with the battery and used to quantify the state of health comprise a rate of discharge measurement.

* * * * *